United States Patent
Schmiedhofer

(10) Patent No.: US 10,826,043 B2
(45) Date of Patent: Nov. 3, 2020

(54) CELL CONNECTION UNIT AND BATTERY MODULE COMPRISING THE SAME

(71) Applicant: Samsung SDI Co., Ltd., Yongin-si (KR)

(72) Inventor: Christoph Schmiedhofer, Graz (AT)

(73) Assignee: Samsung SDI Co., Ltd., Yongin-si (KR)

(*) Notice: Subject to any disclaimer, the term of this patent is extended or adjusted under 35 U.S.C. 154(b) by 888 days.

(21) Appl. No.: 15/476,555

(22) Filed: Mar. 31, 2017

(65) Prior Publication Data

US 2017/0288198 A1    Oct. 5, 2017

(30) Foreign Application Priority Data

Apr. 1, 2016   (EP) .................................... 16163467
Mar. 29, 2017  (KR) ........................ 10-2017-0040101

(51) Int. Cl.
   *H01M 2/20*  (2006.01)
   *H01M 10/48* (2006.01)
   *H01M 2/12*  (2006.01)
   *H01M 10/42* (2006.01)

(52) U.S. Cl.
   CPC ......... *H01M 2/206* (2013.01); *H01M 2/1294* (2013.01); *H01M 10/425* (2013.01); *H01M 10/482* (2013.01); *H01M 10/486* (2013.01); *H01M 2/12* (2013.01); *H01M 2220/20* (2013.01)

(58) Field of Classification Search
   CPC ...... H01M 2/206; H01M 2/1294; H01M 2/12; H01M 10/425; H01M 10/482; H01M 10/486; H01M 2220/20

USPC .......................................................... 429/7
   See application file for complete search history.

(56) References Cited

U.S. PATENT DOCUMENTS

| | | |
|---|---|---|
| 2009/0325042 A1 | 12/2009 | Koetting et al. |
| 2014/0017533 A1 | 1/2014 | Nishihara et al. |
| 2014/0299373 A1 | 10/2014 | Nakamura et al. |
| 2014/0329121 A1 | 11/2014 | Nishihara |
| 2015/0287964 A1 | 10/2015 | Park et al. |
| 2016/0043446 A1 | 2/2016 | Fritz et al. |

(Continued)

FOREIGN PATENT DOCUMENTS

| | | | | |
|---|---|---|---|---|
| JP | 2015187915 A | * | 10/2015 | .......... H01M 10/482 |
| KR | 10-2005-0048277 | | 5/2005 | |

(Continued)

OTHER PUBLICATIONS

EPO website (www.espacenet.com) machine translation of JP 2015187915A (Year: 2015).*

(Continued)

*Primary Examiner* — Gregg Cantelmo
(74) *Attorney, Agent, or Firm* — Lewis Roca Rothgerber Christie LLP

(57) ABSTRACT

Provided is a cell connection unit for a battery module. The cell connection unit includes: a substrate accommodating electrode terminals of the battery module; an electronic unit; a connector connected to the electronic unit; and an electronic circuit electrically connecting at least one of the electrode terminals of the battery module to the electronic unit via the connector. The connector includes a fixed electrical connector and a plurality of fixation connectors.

15 Claims, 8 Drawing Sheets

(56) References Cited

U.S. PATENT DOCUMENTS

2016/0049630 A1* 2/2016 Fuhr .................. B21D 22/02
                                                    429/121
2016/0254515 A1   9/2016 Shimoda et al.
2016/0380318 A1  12/2016 Ichikawa et al.

FOREIGN PATENT DOCUMENTS

| KR | 10-2010-0003146 | 1/2010 |
| WO | WO 2014/024435 A1 | 2/2014 |
| WO | WO 2015/005147 A1 | 1/2015 |
| WO | WO 2015/064329 A1 | 5/2015 |

OTHER PUBLICATIONS

EPO Office Action dated Jan. 3, 2019, for corresponding European Patent Application No. 16163467.0 (7 pages).
Partial European Search Report in corresponding European Application No. 16163467.0-1373, dated Oct. 18, 2016, 9 pages.
Extended European Search Report in corresponding European Application No. 16163467.0-1373, dated Jan. 16, 2017, 14 pages.

* cited by examiner

CELL CONNECTION UNIT AND BATTERY MODULE COMPRISING THE SAME

CROSS-REFERENCED TO RELATED APPLICATION

This application claims priority to and the benefit of European Patent Application No. 16163467.0, filed on Apr. 1, 2016 in the European Patent Office, and Korean Patent Application No. 10-2017-0040101, filed on Mar. 29, 2017 in the Korean Intellectual Property Office, the contents of which are incorporated herein in their entirety by reference.

BACKGROUND

1. Field

Embodiments of the present invention relate to a cell connection unit for a battery module, such as a cell connection unit for a battery module of an electric vehicle. Other embodiments of the present invention relate to a battery module including such a cell connection unit and a method for construction of such a battery module.

2. Description of the Related Art

A rechargeable battery differs from a primary battery in that it is designed to be repeatedly charged and discharged, while the latter is only capable of an irreversible conversion of chemical to electrical energy. Low-capacity rechargeable batteries are used as the power supply for small electronic devices, such as cellular phones, notebook computers, and camcorders, while high-capacity rechargeable batteries are used as the power supply for driving motors in hybrid vehicles and the like.

In general, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. The case may have a cylindrical or rectangular shape depending on the type or anticipated implementation of the rechargeable battery. An electrolyte solution is injected into the case and allows for charging and discharging of the rechargeable battery through an electrochemical reaction of the positive electrode, the negative electrode, and the electrolyte solution.

Rechargeable batteries may be used in a battery module including a plurality of unit batteries or cells coupled to each other in series so as to be used as an energy supply having a relatively high energy density. For example, the battery module is formed by connecting electrode terminals of the plurality of unit batteries to each other, and the number of the unit batteries in the battery module depends on the amount of power desired such that, for example, a high-power rechargeable battery can be realized.

In order to safely use the battery module, heat generated from the rechargeable battery should be efficiently emitted, discharged, and/or dissipated. If the heat emission/discharge/dissipation is not sufficiently performed, a temperature deviation occurs between the respective unit batteries such that the battery module can no longer generate a desired amount of power for, as an example, driving a motor. In addition, if the internal temperature of some of the rechargeable batteries increases due to the heat generated by the rechargeable batteries, an abnormal reaction may occur therein, such that charging and discharging performance of the rechargeable batteries deteriorates and a life-span of the rechargeable batteries is shortened.

The cells (or unit batteries) of the battery module are usually connected to each other by a so-called "busbar", sometimes called a "bus-bar" or a "bus bar". Busbars are generally monolithic and made of a solid metal because their primary function is to electrically connect the cells of the battery module to each other to transfer electrical currents therebetween.

Cell voltage(s) and/or cell temperature(s) of the battery module may be monitored by using a cell monitoring controller (CMC) connected to the battery module and, in some cases, to the busbars. In some cases, the cell monitoring controller (CMC) may be connected directly to the battery cells or connected thereto via a wiring harness. Thus, the packing density of the battery module is reduced due to the additional electronic components included for monitoring cell voltage(s) and temperature(s).

SUMMARY

According to embodiments of the present invention, a cell connection unit for a battery module is provided, such as for a battery module of an electric vehicle. According to embodiments of the present invention, additional space generally needed to accommodate an electronic unit, such as a cell monitoring controller, is reduced and the structure of the cell connection unit is simplified.

According to an embodiment of the present invention, a cell connection unit for a battery module is provided. The cell connection unit includes: a substrate accommodating electrode terminals of the battery module; an electronic unit; a connector connected to the electronic unit; and an electronic circuit electrically connecting at least one of the electrode terminals of the battery module to the electronic unit via the connector. The connector includes a fixed electrical connector and a plurality of fixation connectors.

In some embodiments, the fixed electrical connectors and the plurality of fixation connectors may be press-fit connectors.

In some embodiments, the fixed electrical connectors and the plurality of fixation connectors may be pin connectors.

The cell connection unit may further include a contact portion electrically connected to the at least one of the electrode terminals of the battery module, and the electronic circuit may be electrically connected to the contact portion via the fixed electrical connector.

The contact portion may be adapted to measure a voltage or a temperature of the battery module.

In some embodiments, the electronic circuit may include an integral lead frame portion.

In some embodiments, the substrate may be one piece and may include the same material as the lead frame portion.

The substrate may include an opening portion and a venting portion. The opening portion may accommodate the electronic unit, and the venting portion may extend in a longitudinal direction of the substrate and may have one end facing the opening portion.

At least a portion of the substrate may extend above the connector in a direction perpendicular to a surface of the cell connection unit.

According to another embodiment of the present invention, a battery module is provided including the electronic unit and the cell connection unit, and the electronic unit may be connected to the cell connection unit via the connector.

In some embodiments, the electronic unit may be a cell monitoring controller.

The electronic unit may include a substrate and an electronic component, and the electronic component may be arranged on one side of the substrate that faces a cell unit of the battery module.

The battery module may further include a venting slot adapted to convey gas generated in the battery module to outside of the battery module via a venting outlet.

The venting slot may extend along a longitudinal axis of the battery module and may include a plurality of venting outlets at opposite ends of the venting slot. The venting slot may be formed by the opening portion and the venting portion of the cell connection unit.

Further aspects and features of the present invention will become apparent after a careful review of the detailed description and the accompanying drawings.

BRIEF DESCRIPTION OF THE DRAWINGS

In the drawings, the same indicator numerals indicate the same or substantially the same elements in each of the figures.

DETAILED DESCRIPTION

Figure 1:
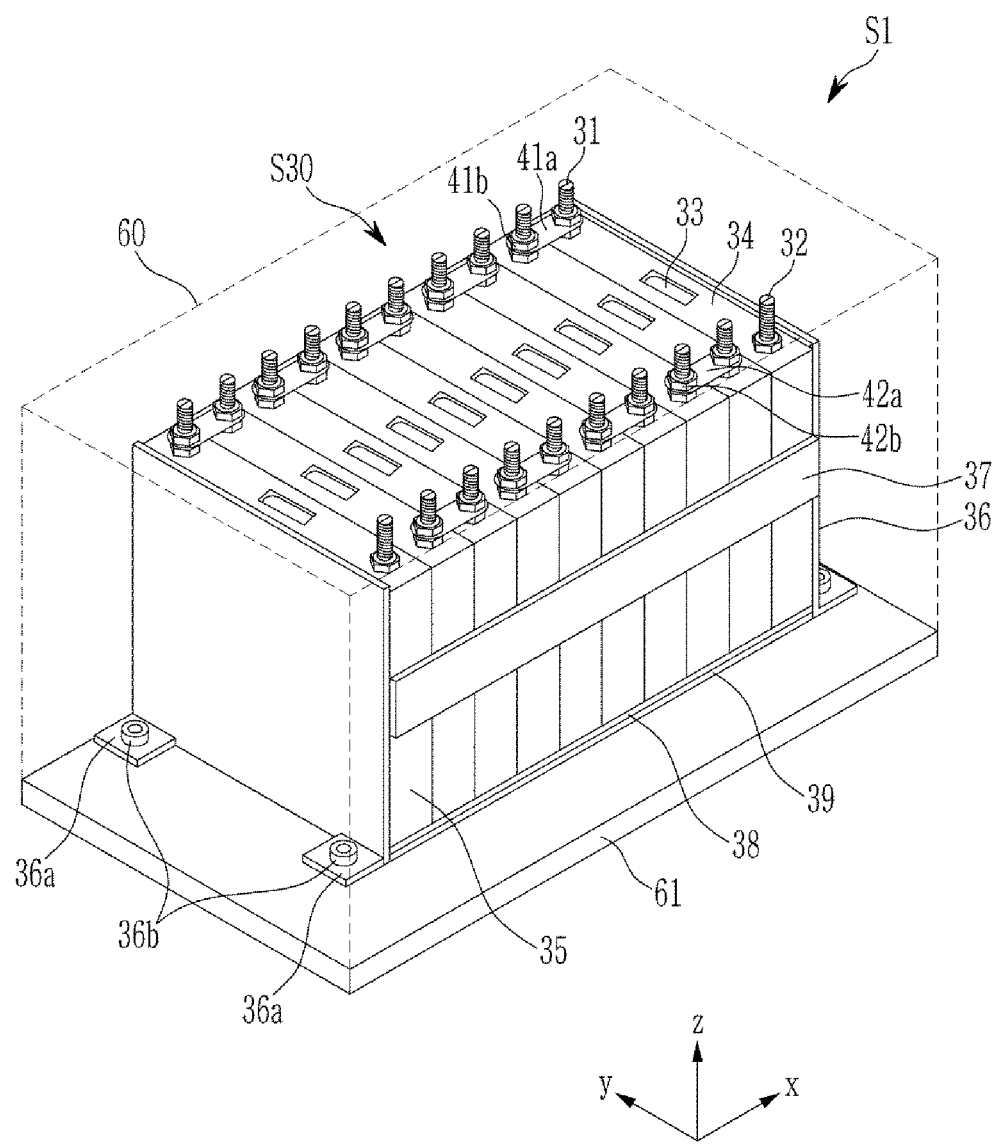
FIG. 1 is a perspective view of a conventional battery module.

It will be understood that when an element or layer is referred to as being "on," "connected to," or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

The electronic unit and/or any other relevant devices or components according to embodiments of the present invention described herein may be implemented utilizing any suitable hardware, firmware (e.g., an application-specific integrated circuit), software, and/or a suitable combination of software, firmware, and hardware. For example, the various components of the electronic unit may be formed on one integrated circuit (IC) chip or on separate IC chips. Further, the various components of the electronic unit may be implemented on a flexible printed circuit film, a tape carrier package (TCP), a printed circuit board (PCB), or formed on a same substrate as the electronic unit. Further, the various components of the electronic unit may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present invention.

Referring to FIG. 1, a conventional battery module S1 includes a plurality of battery cells 35 aligned along one direction and a heat exchange member 38 (e.g., a heat exchanger) adjacent to a bottom surface of the plurality of battery cells 35. A pair of end plates 36 are provided to face wide surfaces of the battery cells 35 at the outside of the battery module S1 (e.g., are provided adjacent the outermost ones of the battery cells 35), and a connection plate 37 is configured to connect the pair of end plates 36 to each other, thereby fixing the plurality of battery cells 35 together. Fastening portions 36a extend from the end plates 36 at both sides of the battery module S1 and are fastened to a support plate 61 by bolts 36b. The support plate 61 is part of a housing 60 of the battery module S1.

As shown, each of the battery cells 35 is a prismatic cell (e.g., a rectangular cell), and the wide flat surfaces of the battery cells 35 are stacked together (e.g., are stacked to face each other) to form a cell unit S30 of the battery module S1. Further, each of the battery cells 35 includes a battery case configured to accommodate an electrode assembly and an electrolyte. The battery case is hermetically sealed by a cap assembly 34. The cap assembly 34 includes positive and negative electrode terminals 31 and 32, which have different polarities from each other, and a vent 33. The vent 33 is a safety device of the battery cell 35 and acts as a passage way for gas that is generated in the battery cell 35 to be discharged to outside of the battery cell 35. The positive and negative electrode terminals 31 and 32 of neighboring ones of the battery cells 35 are respectively electrically connected to each other through a busbar 41a, 42a. The busbar 41a, 42a may be fixed (e.g., may be fixed to the positive and negative terminals 31, 32) by a nut 41b, 42b. Hence, the battery module S1 may be used as power source (e.g., a power source unit) including an electrically connected bundle of the plurality of battery cells 35.

Generally, the battery cells 35 generate a large amount of heat while being charged/discharged. The generated heat is accumulated in the battery cells 35, thereby accelerating deterioration of the battery cells 35. Therefore, the battery module S1 further includes the heat exchange member 38, which is provided adjacent to the bottom surface of the battery cells 35, so as to cool the battery cells 35. In addition, an elastic member 39 made of rubber or another elastic material may be interposed between the support plate 61 and the heat exchange member 38.

The heat exchange member 38 may include a cooling plate. The cooling plate may have a size corresponding to that of the bottom surface of the plurality of battery cells 35 (e.g., the cooling plate may completely cover or overlap the entire bottom surfaces of all the battery cells 35 in the battery module S1). The cooling plate generally includes a passage way through which a coolant may move or flow. The coolant performs heat exchange with the battery cells 35 while circulating inside (e.g., circulating through) the heat exchange member 38 (e.g., while circulating inside the cooling plate).

Probes for cell voltage measurements of the battery module S1 may be provided by a wiring harness which connects the electrode terminals 31, 32 with a cell monitoring controller ("CMC"). The wiring harness may typically be screwed or welded to the electrode terminals 31, 32 in order to contact the electrode terminals 31, 32. In other cases, the wiring harness may be connected to the cell monitoring controller C via a plug. However, the vent 33 of each of the battery cells 35, which conveys the gas to the outside of the battery cells 35, may be obstructed by the wiring harness. It has been observed that the use of the wiring harness may lead to a short circuit within the battery module S1. Moreover, the cell monitoring controller may need to be manually connected to the battery module S1 via the wiring harness.

Figure 2:
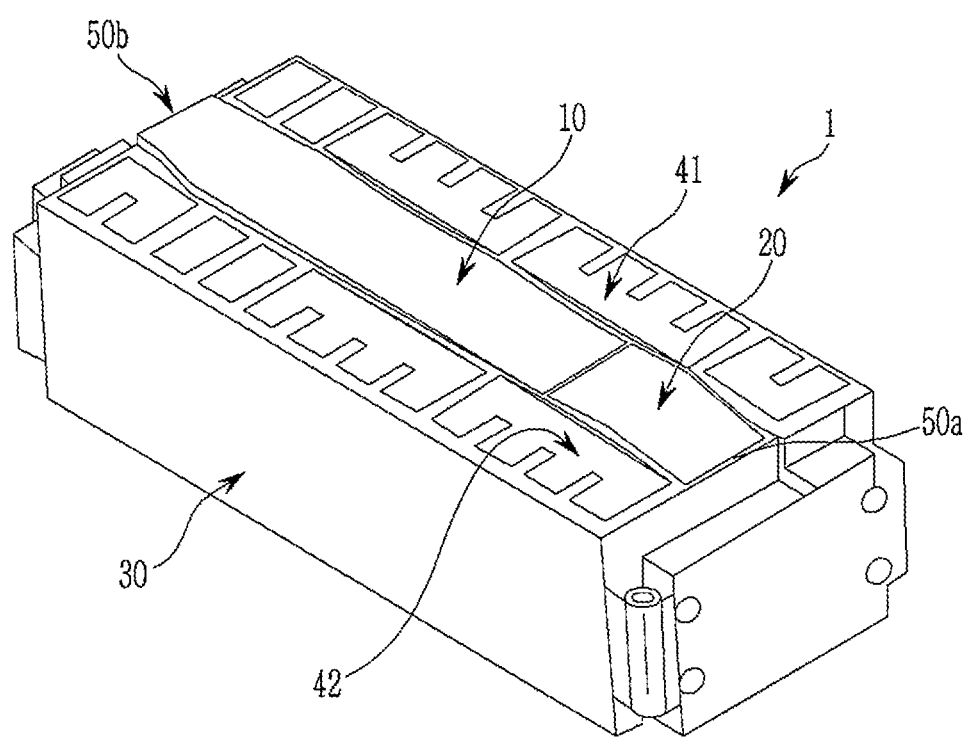
FIG. 2 is a perspective view of a battery module according to an embodiment of the present invention.

Referring to FIG. 2, a battery module 1 according to an embodiment of the present invention includes a cell connection unit 10 ("CCU") and an electronic unit 20 (e.g., the CMC). The battery module may further include a cell unit 30, which may be the same as or similar to the cell unit illustrated in FIG. 1. However, rather than including separate components for a busbar holder and a wiring harness, the cell connection unit 10 may include a carrier for busbar units 41, 42 and a carrier for the electronic unit 20 and may provide an electrical connection between and fixation of the electronic unit 20 to the cell connection unit via press-fit technology, as will be described in greater detail below. In some embodiments, the cell connection unit 10 is a component disposed between the cell unit 30 and the electronic unit 20.

As shown, the battery module 1 has two venting outlets 50a, 50b at opposite sides of the battery module 1. For example, the battery module 1 primarily extends along a longitudinal direction, which may correspond to a stacking direction (e.g., an arrangement direction) of the cells. The venting outlets 50a, 50b may be in fluid communication with each other via a venting passage, which primarily extends centrally along the longitudinal direction of the battery module 1. The venting outlets 50a, 50b convey gas produced by the cells. At least a portion of the venting passage is arranged below the electronic unit 20 such that a space-saving structure is provided.

Figure 3:
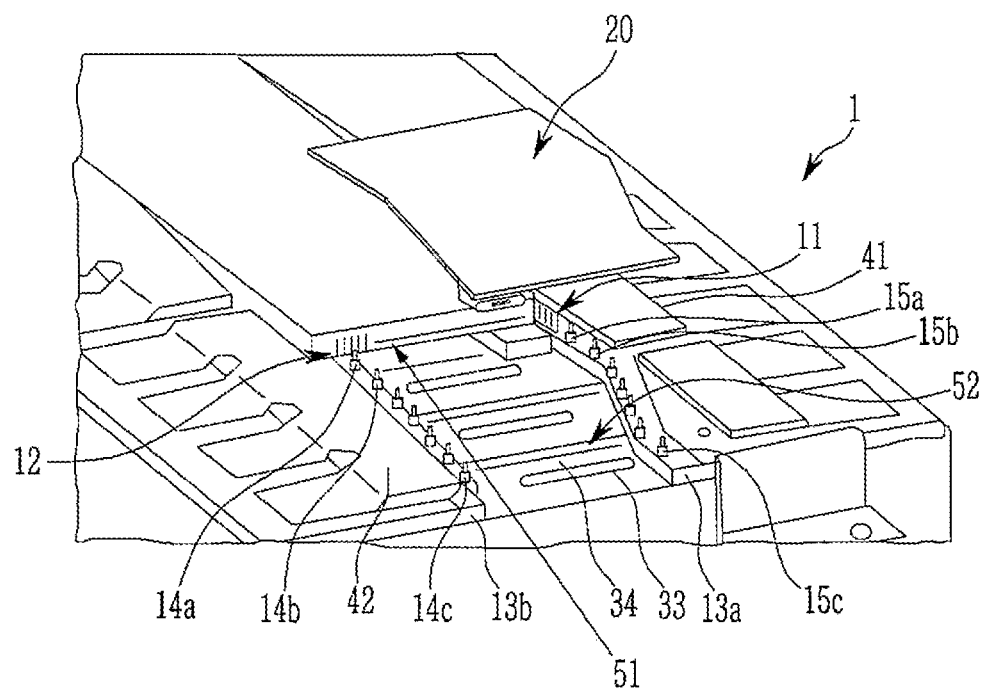
FIG. 3 is a locally enlarged and exploded view of the battery module shown in FIG. 2.

FIG. 3 is a locally enlarged and exploded view of the battery module 1 of FIG. 2. In FIG. 3, the cell connection unit 10 according to an embodiment of the present invention is shown. The cell connection unit 10 includes substrate portions 13a, 13b, 13c, at least one of which is adapted to accommodate electrode terminals 31, 32 of the battery module 1. For example, at least one of the substrate portions 13a, 13b, 13c is adapted to accommodate the electrode terminals 31, 32 of the cell unit 30 (which can be seen in the enlarged view of FIG. 4). The cell connection unit 10 is further adapted to accommodate the busbar units 41, 42, which are adapted to electrically connect two or more of the electrode terminals 31, 32 of the battery module 1 to each other. For example, the cell connection unit 10 is a busbar holder, and the side portions 13a, 13b of the substrate portions 13a, 13b, 13c provide a carrier for holding the busbar units 41, 42.

The cell unit 30 further includes a vent 33 and a cap assembly 34 which hermetically seals the battery case. The vent 33 is provided in the cap assembly 34. The vent 33 is a safety device of the battery cell unit 30 and acts as a passage way for gas that is generated in the battery cell to be discharged to the outside of the battery cell. A first and a second venting slot portion 51, 52 are adapted to merge the gas collected from (e.g., discharged by) each one of the cell units and to guide the gas to the outside of the battery module 1. The first venting slot portion 51 extends below the central substrate portion 13c and along a flow path between the cell connection unit 10 and the cell unit 30. The second venting slot portion 52 is arranged below the electronic unit 20 when the electronic unit 20 is connected to the cell connection unit 10. Thus, the battery module 1, including a bottom portion of the cell connection unit 10 and a top portion of the cell unit 30, is adapted such that the second venting slot portion 52 is below the electronic unit 20 when the electronic unit 20 is connected to the cell connection unit 10.

The cell connection unit further includes a connector portion 11, 12, 14a, 14b, 14c, 15a, 15b, 15c adapted to be connected to the electronic unit 20. The connector portion 11, 12, 14a, 14b, 14c, 15a, 15b, 15c includes at least one fixed electrical connector 11, 12 and a plurality of fixation connectors 14a, 14b, 14c, 15a, 15b, 15c. In the illustrated embodiment, the plurality of fixation connectors 14a, 14b, 14c, 15a, 15b, 15c includes a first fixation connector array 14a, 14b, 14c and a second fixation connector array 15a, 15b, 15c to provide a mechanically stable connection between the electronic unit 20 and the cell connection unit 10. The first and second fixation connector arrays 14a, 14b, 14c, 15a, 15b, 15c are arranged at opposite sides or lateral edges of the electronic unit 20. The fixed electrical connectors 11, 12 and the plurality of fixation connectors 14a, 14b, 14c, 15a, 15b, 15c are connector plugs, which are shown as press-fit pin connectors. The cell connection unit 10 may be an over-molded lead frame adapted to electrically connect the electrode terminals 31, 32 and the electronic unit 20 to each other. Press-fit technology allows a relatively simple attachment of the electronic unit 20 to the cell connection unit 10 with the benefit that the press-fit pins 14a, 14b, 14c, 15a, 15b, 15c are connected to the cell voltage signals portions, which may be used for cell temperature and/or voltage measurement(s). The press-fit pins 14a, 14b, 14c, 15a, 15b, 15c are arranged along the lateral edges of the electronic unit 20 and are adapted to stabilize the electronic unit 20 with respect to the cell connection unit 10.

Figure 4:
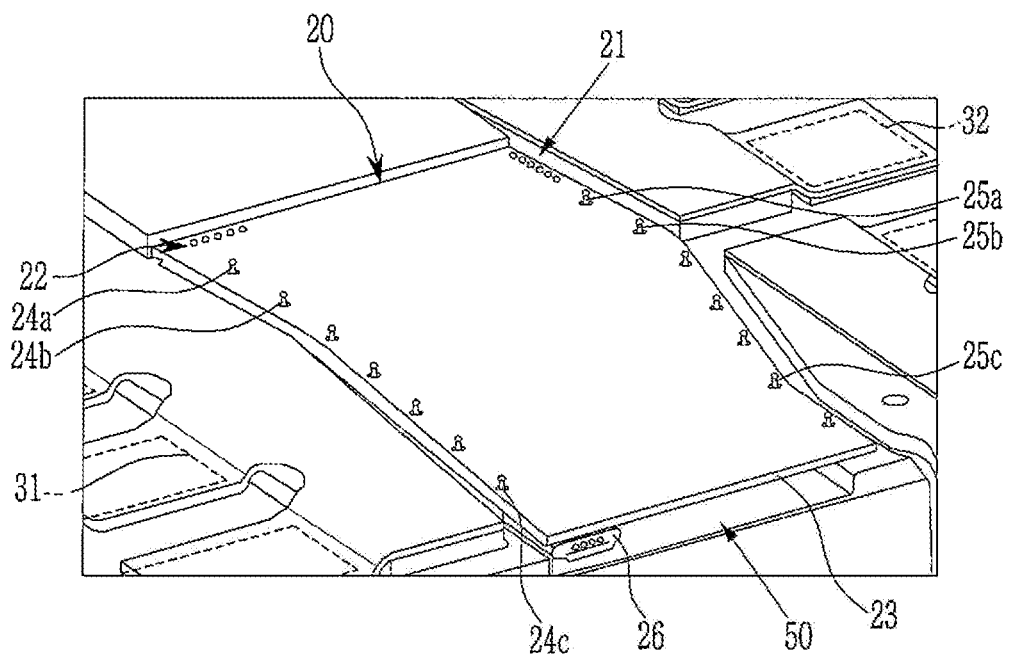
FIG. 4 is a non-exploded perspective view of the battery module shown in FIG. 3.

FIG. 4 is a non-exploded perspective view of the battery module shown in FIG. 3. In the illustrated embodiment, the electronic unit 20 is connected to the cell connection unit 10 via the connector portion 11, 12, 14a, 14b, 14c, 15a, 15b, 15c. The electronic unit 20 may be a printed circuit board (PCB) attached to the cell connection unit 10 without any screws or molded plastic clips. This simple fixation configuration may allow for a reduction in production costs compared to typical connection structures. The electronic unit 20 includes a substrate 23 which primarily extends along a plane, thereby forming an electronic board. The electronic unit 20 may be a cell monitoring controller ("CMC"). The electronic unit 20 may include a bus connector 26 adapted for data communication with an external device.

The electronic unit 20 also includes a further connector portion 21, 22, 24a, 24b, 24c, 25a, 25b, 25c adapted to be connected to the connector portion 11, 12, 14a, 14b, 14c, 15a, 15b, 15c of the cell connection unit 10. For example, the further connector portion 21, 22, 24a, 24b, 24c, 25a, 25b, 25c of the electronic unit 20 and the connector portion 11, 12, 14a, 14b, 14c, 15a, 15b, 15c of the cell connection unit 10 are mating connector portions. The further connector portion 21, 22, 24a, 24b, 24c, 25a, 25b, 25c includes at least one electrical connector socket 21, 22 adapted to be electrically connected to the fixed electrical connectors 11, 12 and a plurality of fixation connector sockets 24a, 24b, 24c, 25a, 25b, 25c adapted to be mechanically connected to the fixation connector 14a, 14b, 14c, 15a, 15b, 15c of the cell connection unit 10. In some embodiments, the further connector portion 21, 22, 24a, 24b, 24c, 25a, 25b, 25c may include a plurality of connector openings 21, 22, 24a, 24b, 24c, 25a, 25b, 25c (e.g., connector holes) adapted to be connected to the press-fit pin connectors of the cell connection unit 10.

In the illustrated embodiment, the electronic unit 20 includes two electrical connector sockets 21, 22, such as bus connector sockets. The cell connection unit 10 includes two electrical connectors 11, 12, such as bus connector plugs. The bus connectors 11, 12 and the bus connector sockets 21, 22 are connected to each other via press-fit technology. The fixation connector sockets 24a, 24b, 24c, 25a, 25b, 25c include a first fixation connector socket 24a, 24b, 24c and a second fixation connector socket 25a, 25b, 25c.

When the electronic unit 20 is connected to the battery module 1, a venting slot 50 is formed which includes the venting outlets 50a, 50b at the respective ends of the battery module 1, as shown in FIG. 2. The venting slot 50 centrally extends along a longitudinal direction of the battery module 1 and includes the first and second venting slot portions 51, 52, described above.

As further shown, the cell connection unit 10 holds (or accommodates) the busbar units 41, 42, which electrically connect respective ones of the electrode terminals 31, 32 to each other.

Figure 5:
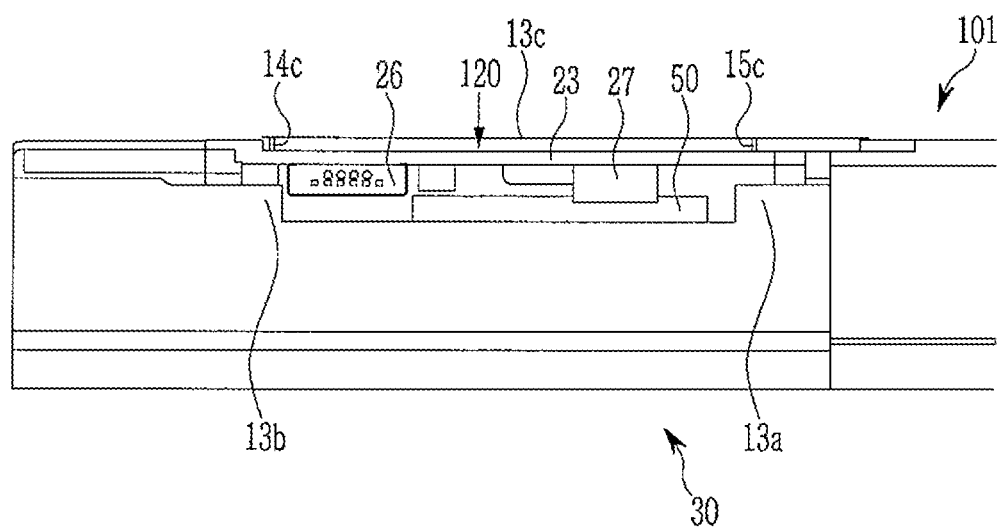
FIG. 5 is a schematic front view of a battery module according to another embodiment of the present invention.

Referring to FIG. 5, a battery module 101 according to another embodiment of the present invention is shown. An electronic unit 120 (e.g., a PCB and/or CMC) includes at least one electronic component 27 arranged on one side of the substrate 23 which faces the cell unit 30 of the battery module 101. The electronic component(s) 27 is on the bottom side of the electronic unit 120 in available space (e.g., in otherwise unoccupied space) below the electronics in order to reduce the overall height of the assembly. The venting slot 50 includes a cavity for the cell connection unit 10 positioned below the electronic unit 120, and the cavity may be sized to provide enough space to accommodate the electronic components 27 without obstructing other portions of the venting slot 50. As used herein, "enough space" indicates an amount of space sufficient to form the second venting slot portion 52 for the venting slot 50 below the electronic unit 120 such that fluid communication is permitted between the venting outlets 50a, 50b through the venting slot 50.

FIG. 5 illustrates the utilization of the available space by the electronic unit 120. In the illustrated embodiment, the press-fit pins 14c, 15c are located between the busbar units 41, 42. The substrate 23 includes the substrate portions 13a, 13b, 13c, and the central portion 13c of the substrate 23 connects (e.g., extends between) the side portions 13a, 13b of the substrate 23. The central portion 13c exceeds (e.g., is or extends above) the side portions 13a, 13b in a vertical direction. The central portion 13c further exceeds (e.g., is or extends above) the electronic unit 20 in the vertical direction. The cell connection unit 10 primarily extends along a plane which is perpendicular to the vertical direction. Thus, a relatively strong shock resistance with respect to mechanical or physical impacts and a relatively high packing density can be achieved.

Figure 6:
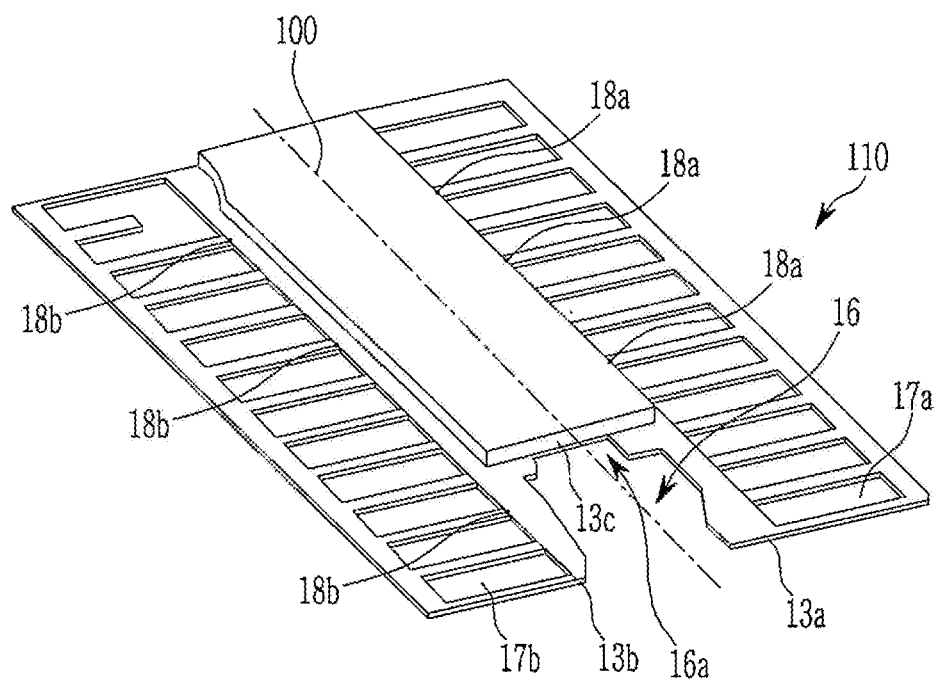
FIG. 6 is a top perspective view of a cell connection unit according to another embodiment of the present invention.

Referring to FIG. 6, a cell connection unit 110 according to another embodiment of the present invention is shown. At least one of the substrate portions 13a, 13b, 13c of the cell connection unit 110 includes an opening portion 16 adapted to accommodate the electronic unit 20 and a venting portion 16a. The venting portion 16a has a longitudinal shape (e.g., extends in a longitudinal direction) with one end facing the opening portion 16. The centrally arranged substrate portion 13c, which includes the venting portion 16a, extends along a longitudinal axis 100 of the cell connection unit 110.

At least one of the substrate portions 13a, 13b, 13c also includes terminal openings 17a, 17b adapted to accommodate the electrode terminals 31, 32 of the cell unit 30. The cell connection unit 110 further includes at least one contact portion, such as at least one contact pad 18a, 18b, adapted to be electrically connected to the electrode terminals 31, 32 of the battery module 1. The contact portions may be provided for voltage and/or temperature measurement(s) of the battery cells.

Figure 7:
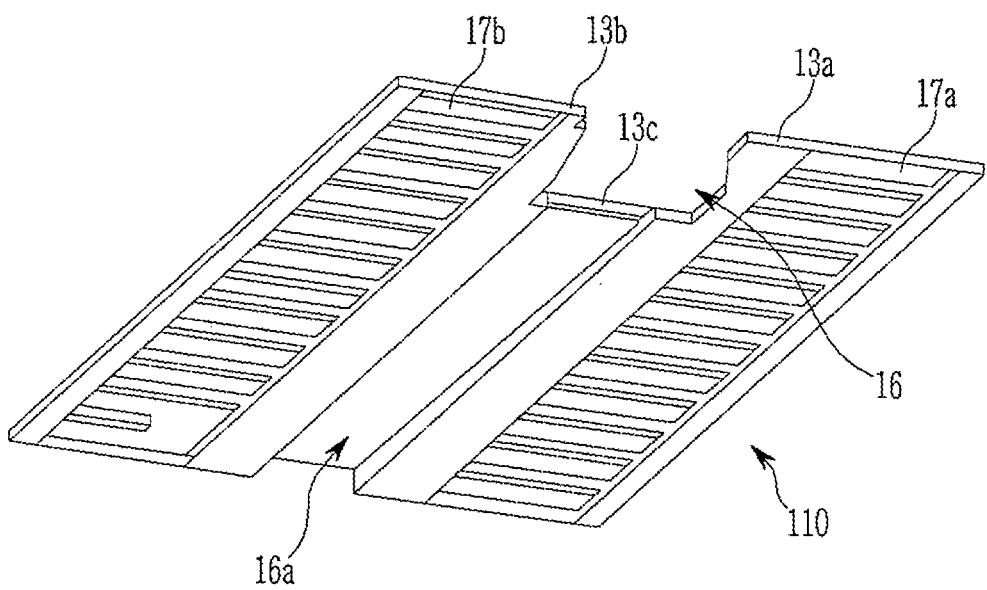
FIG. 7 is a bottom perspective view of the cell connection unit shown in FIG. 6.

FIG. 7 is a bottom perspective view of the cell connection unit 110 shown in FIG. 6. In the illustrated embodiment, the venting portion 16a is a recess in the central substrate portion 13c. The venting portion 16a and the central substrate portion 13c both centrally extend along the longitudinal axis 100 of the cell connection unit 110 to form the first venting slot portion 51, described above.

Figure 8:
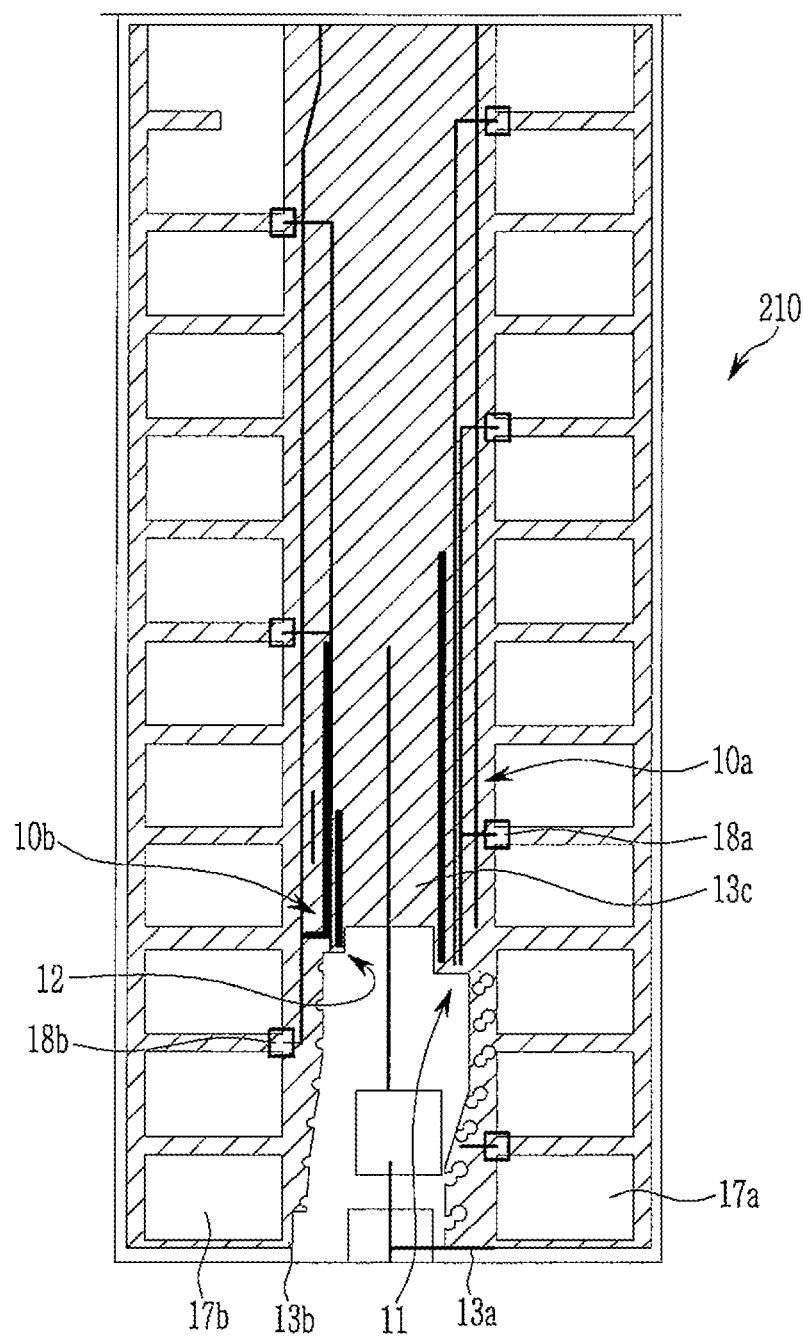
FIG. 8 is a plan cross-sectional view of a cell connection unit according to another embodiment of the present invention.

Referring to FIG. 8, a cell connection unit 210 according to another embodiment of the present invention includes an electronic circuit portion 10a, 10b adapted to provide an electrical connection between at least one of the electrode terminals 31, 32 of the battery module 1 and the electronic unit 20 via the connector portion 11, 12, such as via the fixed electrical connectors 11, 12. The at least one electronic circuit portion 10a, 10b is adapted to electrically connect the at least one contact pad 18a, 18b of the battery module 1 with the at least one fixed press-fit electrical connector 11, 12. The electronic circuit portion 10a, 10b is shown as a built-in (or integral) lead frame portion of the cell connection unit 210, but the present invention is not limited thereto.

According to embodiments of the present invention, a cell connection unit for a battery module may include at least one substrate portion adapted to accommodate electrode terminals of the battery module, a connector portion adapted to be connected to an electronic unit, and an electronic circuit portion adapted to provide an electrical connection between at least one of the electrode terminals of the battery module and the electronic unit via the connector portion. The connector portion may include at least one fixed electrical connector and a plurality of fixation connectors.

In some embodiments, the electronic unit may be a control unit, such as a cell monitoring control unit (CMC) adapted to provide at least one of cell voltage measurements and temperature measurements of at least one battery cell of the battery module. The connector portion may be adapted to be connected to the electronic unit via the at least one fixed electrical connector and via the plurality of fixation connectors. For example, the electronic unit may be electrically connected to the cell connection unit via the fixed electrical connector. The electronic unit may be further mechanically connected to the cell connection unit via the fixation connectors. In embodiments of the present invention, a fixed electrical connector may be any suitable electrical connector that is immovably fixed relative to the at least one substrate portion of the cell connection unit.

By providing the fixed electrical connectors, a defined routing of cables for cell voltage measurements may be provided. Thus, use of a wiring harness, which may obstruct a venting channel of the battery module when improperly routed, which may lead to a short circuit, may not be used. Moreover, rather than manually fixing the flexible wiring harness, the electronic unit may be fixed to the battery module by using an automatic process.

The at least one substrate portion may be adapted to accommodate at least one busbar unit. Thus, the cell connection unit may be a module which integrates a busbar holder and the functionality of a wiring harness in one component.

At least one of the fixed electrical connectors and the plurality of fixation connectors may be press-fit connectors. For example, either the at least one fixed electrical connector may be a press-fit connector or the plurality of fixation connectors may be press-fit connectors, or both the at least one fixed electrical connector and the plurality of fixation connectors may be press-fit connectors. At least one of the fixed electrical connectors and the plurality of fixation connectors may be pin connectors. For example, either the at least one fixed electrical connector may be a pin-connector or the plurality of fixation connectors may be pin-connectors, or both the at least one fixed electrical connector and the plurality of fixation connectors may be pin-connectors. The electronic unit may be an electronic board directly fixed to the cell connection unit without screws or plastic clips. Press-fit technology may be used for conduction of cell voltage signals and fixation of the cell monitoring controller.

The cell connection unit may further include at least one contact portion adapted to be electrically connected to the at least one of the electrode terminals of the battery module, and the at least one electronic circuit portion may be adapted to electrically connect the at least one contact portion of the battery module with the at least one fixed press-fit electrical connector. The at least one contact portion may be a contact pad. The electronic circuit portion may be a built-in lead frame portion of the cell connection unit. The at least one substrate portion may be one piece formed of the same material as the lead frame portion. The cell connection unit may include or may be an over-molded lead frame which does not require an additional plug or interface because the plugs are molded into the cell connection unit.

The at least one substrate portion may include an opening portion adapted to accommodate the electronic unit and a venting portion, and the venting portion may extend in a longitudinal direction with one end facing the opening portion. Thus, multiple venting gas outlets may provide a defined gas path. The lead frame may be routed around the venting outlets (e.g., at least not routed above the venting outlets), which may improve the safety of the battery module.

At least one of the substrate portions may exceed (e.g., may extend above) the connector portion along a direction perpendicular to a plane along which the cell connection unit primarily extends. Thus, the cell monitoring controller may be kept out of a crash or contact area, thereby improving the shock resistance of the battery module.

In accordance with an embodiment of the present invention, a battery module includes an electronic unit and a cell connection unit, and the electronic unit is connected to the cell connection unit via the connector portion.

The electronic unit may be a printed electronic board (PCB), such as a PCB controller. The electronic unit may be a cell monitoring controller (CMC). The electronic unit may include a substrate. The substrate may primarily extend along a plane and may have a first side and a second side opposite the first side. The electronic unit may include at least one electronic component, and the at least one electronic component of the electronic unit may be arranged on the side of the substrate that faces the cell unit of the battery module, for example, the first side. The electronic unit may include at least one further electronic component arranged on the first side of the electronic unit. The at least one electronic component, the at least one further electronic component, and any other electronic components of the electronic unit may be arranged on the same side (e.g., the first side) of the substrate. The electronic unit may be an electronic board located on top of the over-molded lead frame, thereby providing a space-saving arrangement or configuration. A relatively high packing density may thereby be provided in a top region of the battery module, thereby providing more space and a greater energy density of the battery module.

The battery module may include a venting slot adapted to convey gas generated in the battery module to the outside of the battery module via at least one venting outlet.

The venting slot may extend along a longitudinal axis of the battery module and may include at least two venting outlets positioned at opposite ends of the venting slot. The venting slot may be formed by the opening portion and the venting portion of the cell connection unit. For example, the venting slot may include (e.g., may be defined by) the venting portion and a top surface of a cell unit to which the cell connection unit is attached. Thus, multiple venting gas outlets may provide a defined gas path. The venting slot may provide a merged venting channel for all of the cells in the battery module. A gas outlet may be provided at least at the front side of the battery module.

According to embodiments of the present invention, a method for construction of a battery module includes: providing a cell connection unit, assembling at least one busbar unit and at least one substrate portion of the cell connection unit together, and joining the cell connection unit and a cell unit to form the assembled battery module. The at least one busbar unit may be connected to the at least one substrate portion of the cell connection unit prior to joining the cell connection unit and the cell unit to form the assembled battery module. Likewise, an electronic unit may be connected to the cell connection unit prior to or subsequent to joining the cell connection unit to a cell unit to form the assembled battery module. Thus, the battery module may be constructed by using an automatic or automated process (e.g., may be constructed without requiring manual work) because the attachment of the wiring harness may be omitted and the cell connection unit and busbars can be pre-assembled before they are mounted to the cell-pack.

Although exemplary embodiments of the present invention have been described above, it is to be understood that many other possible modifications and variations can be made therein without departing from the scope of the present invention. It is therefore contemplated that the appended claims will cover such modifications and variations that fall within the scope of the claims and their equivalents.

SOME OF THE REFERENCE NUMBERS

| | |
|---|---|
| 1, 101, S1 | Battery module |
| 10, 110, 210 | Cell connection unit |
| 10a, 10b | Electronic circuit portion |
| 11, 12 | Electrical connectors |
| 13a, 13b, 13c | Substrate portions |
| 14a, 14b, 14c | Fixation connectors |
| 15a, 15b, 15c | Fixation connectors |
| 16 | Opening portion |
| 16a | Venting portion |
| 17a, 17b | Terminal openings |
| 18a, 18b | Contact pads |
| 20, 120 | Electronic unit |
| 21, 22 | Electrical connector sockets |
| 23 | Substrate/electronic board |
| 24a, 24b, 24c | Fixation connector sockets |
| 25a, 25b, 25c | Fixation connector sockets |
| 26 | Bus Connector |
| 27 | Electronic component |
| 30, S30 | Cell unit |
| 31, 32 | Electrode terminals |
| 33 | Vent |
| 34 | Cap assembly |
| 35 | Battery cell |
| 36 | Endplate |
| 36a | Fastening portion |
| 36b | Bolt |
| 37 | Connection plate |
| 38 | Heat exchange member |
| 39 | Elastic member |
| 41, 42 | Busbar units |
| 41a, 42a | Busbar |
| 41b, 42b | Nut |
| 50 | Venting slot |
| 50a, 50b | Venting outlets |
| 51, 52 | First and second venting slot portions |
| 60 | Housing |
| 61 | Support plate |
| 100 | Longitudinal axis |

What is claimed is:

1. A cell connection unit for a battery module, the cell connection unit comprising:
a substrate accommodating electrode terminals of the battery module;
an electronic unit;
a connector connected to the electronic unit, the connector comprising a fixed electrical connector and a plurality of fixation connectors, the fixed electrical connector and the plurality of fixation connectors being independently connected to the electronic unit; and
an electronic circuit electrically connecting at least one of the electrode terminals of the battery module to the electronic unit via the connector.

2. The cell connection unit of claim 1, wherein the fixed electrical connector and the plurality of fixation connectors are press-fit connectors.

3. The cell connection unit of claim 1, wherein the fixed electrical connector and the plurality of fixation connectors are pin connectors.

4. The cell connection unit of claim 1, further comprising:
a contact portion electrically connected to the at least one of the electrode terminals of the battery module,
wherein the electronic circuit is electrically connected the contact portion via the fixed electrical connector.

5. The cell connection unit of claim 4, wherein the contact portion is adapted to measure a voltage or a temperature of the battery module.

6. The cell connection unit of claim 1, wherein the electronic circuit comprises an integral lead frame portion.

7. The cell connection unit of claim 6, wherein the substrate is one piece and comprises the same material as the lead frame portion.

8. The cell connection unit of claim 1, wherein the substrate comprises an opening portion and a venting portion,
wherein the opening portion accommodates the electronic unit, and
wherein the venting portion extends in a longitudinal direction of the substrate and has one end facing the opening portion.

9. The cell connection unit of claim 1, wherein at least a portion of the substrate extends above the connector in a direction perpendicular to a surface of the cell connection unit.

10. A battery module comprising the electronic unit and the cell connection unit of claim 1,
wherein the electronic unit is connected to the cell connection unit via the connector.

11. The battery module of claim 10, wherein the electronic unit is a cell monitoring controller.

12. The battery module of claim 10, wherein the electronic unit comprises a substrate and an electronic component,
wherein the electronic component is arranged on one side of the substrate that faces a cell unit of the battery module.

13. The battery module of claim 10, further comprising a venting slot adapted to convey gas generated in the battery module to outside of the battery module via a venting outlet.

14. The battery module of claim 13, wherein the substrate comprises an opening portion and a venting portion,
wherein the opening portion accommodates the electronic unit, and
wherein the venting portion extends in a longitudinal direction of the substrate and has one end facing the opening portion.

15. The battery module of claim 14, wherein the venting slot extends along a longitudinal axis of the battery module and comprises a plurality of venting outlets at opposite ends of the venting slot, and
wherein the venting slot is formed by the opening portion and the venting portion of the cell connection unit.

* * * * *